Oct. 22, 1935.  R. LAPSLEY  2,017,906
TRANSMISSION
Filed Nov. 5, 1932  4 Sheets-Sheet 2
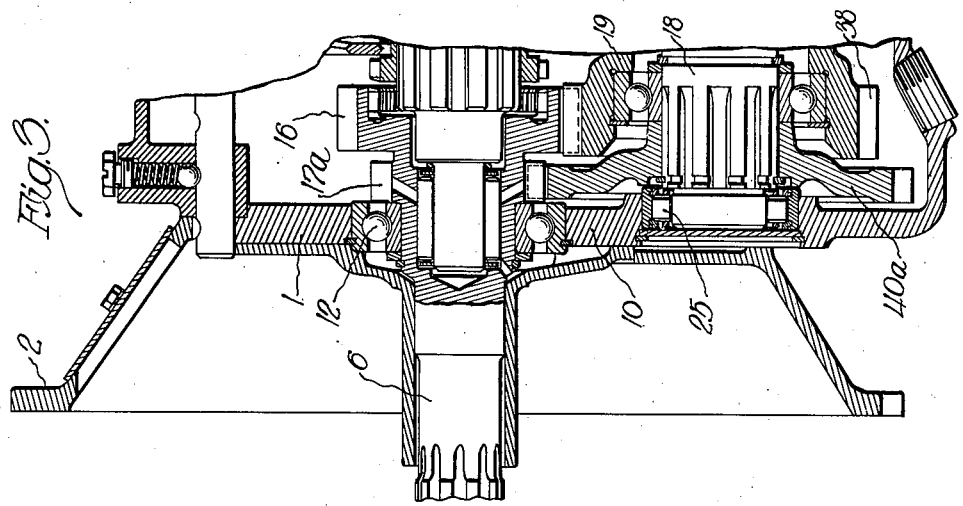
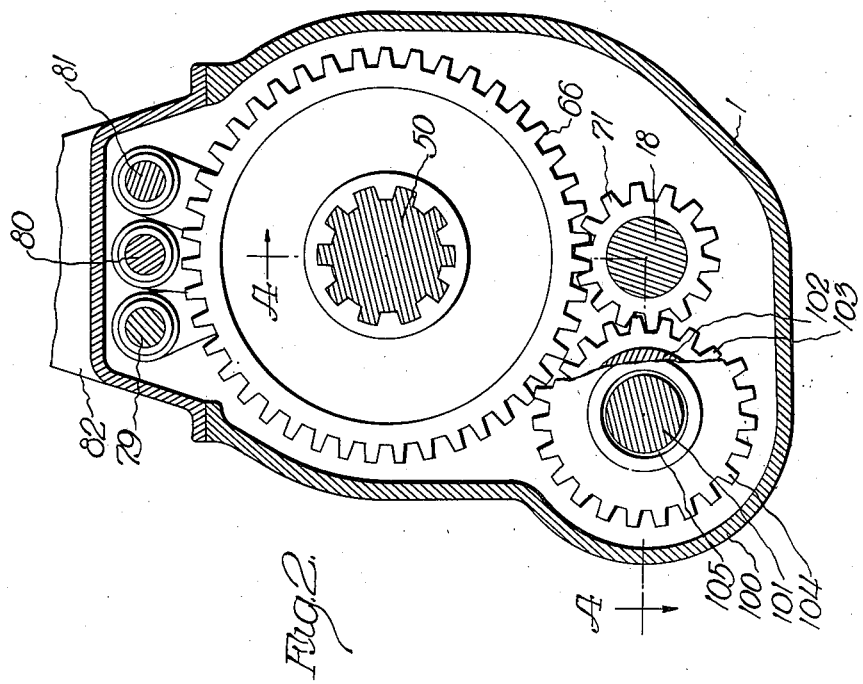
Inventor:
Robert Lapsley
By Brown Jackson Bouchev Drennes
Attys.

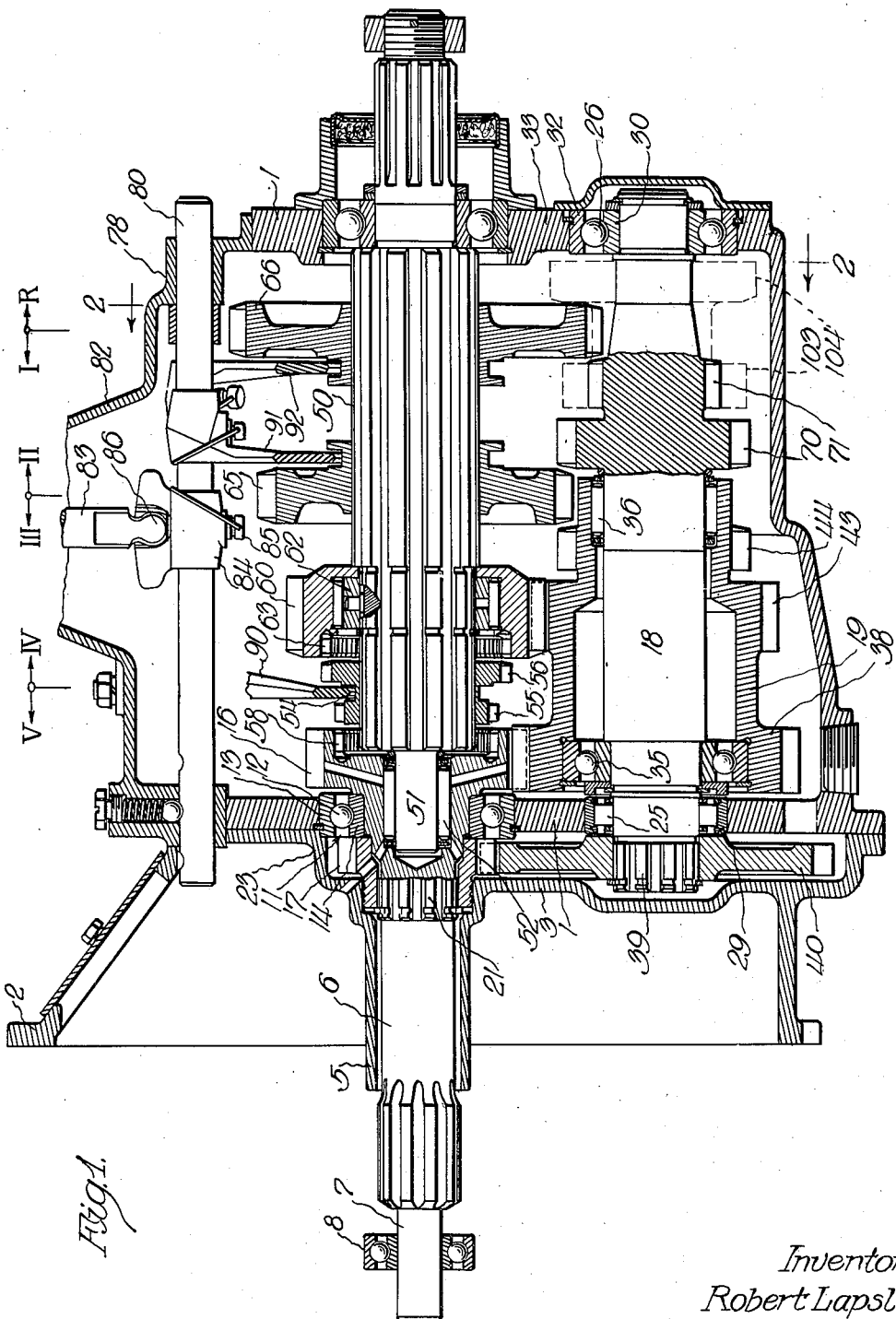

Oct. 22, 1935.  R. LAPSLEY  2,017,906
TRANSMISSION
Filed Nov. 5, 1932  4 Sheets-Sheet 3
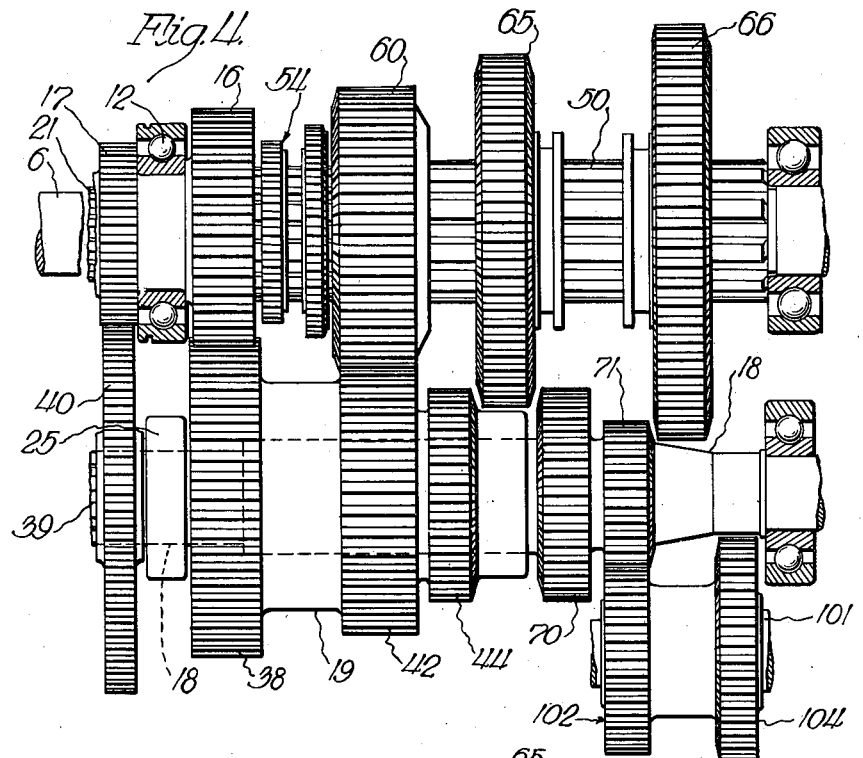
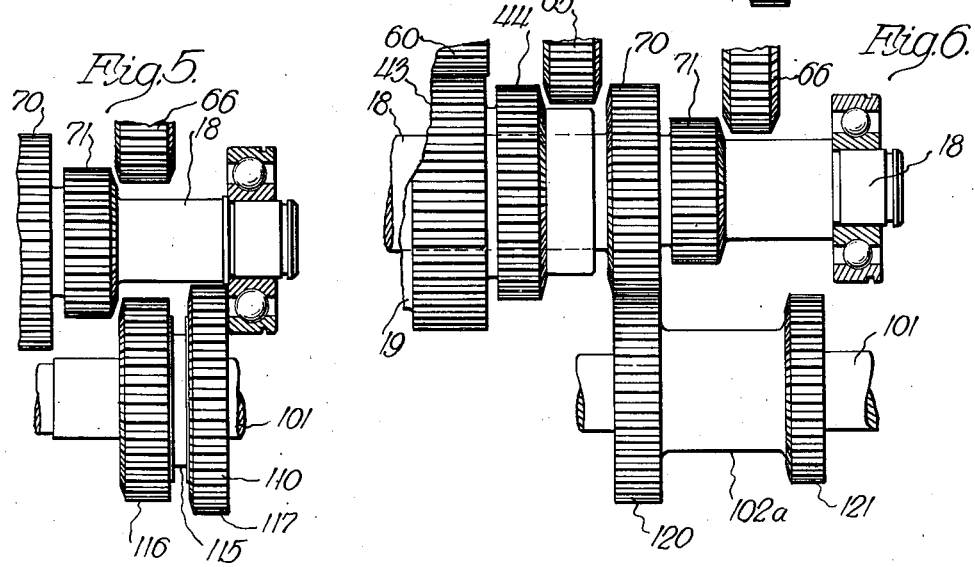
Inventor:
Robert Lapsley
By Brown, Jackson, Boettcher & Dienner
Attys.

Oct. 22, 1935.  R. LAPSLEY  2,017,906
TRANSMISSION
Filed Nov. 5, 1932  4 Sheets-Sheet 4
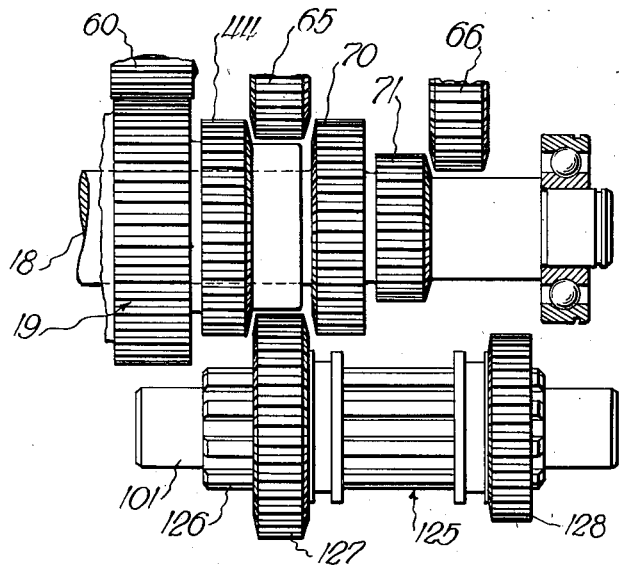
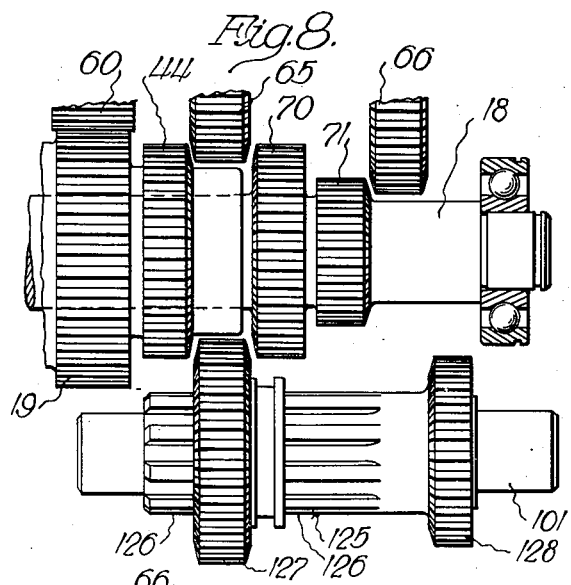
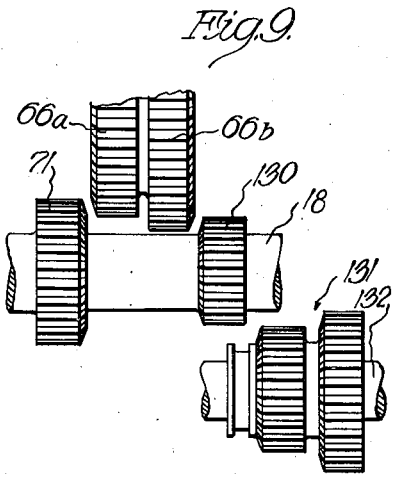
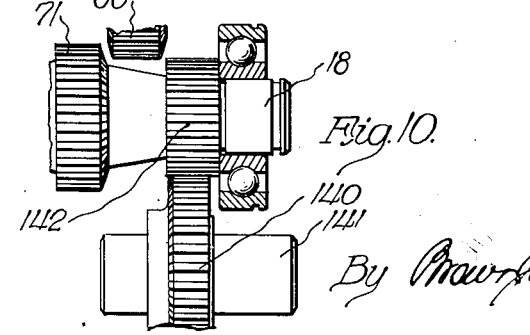
Inventor:
Robert Lapsley
By Mawr Jackson Bottcher Denner
Attys.

Patented Oct. 22, 1935

2,017,906

UNITED STATES PATENT OFFICE 2,017,906

TRANSMISSION

Robert Lapsley, Berrien Springs, Mich., assignor to Clark Equipment Company, Buchanan, Mich., a corporation of Michigan Application November 5, 1932, Serial No. 641,327

6 Claims. (Cl. 74—333)

The present invention relates generally to transmissions for automobiles and other vehicles and is particularly concerned with certain improvements in the change speed gearing and the arrangement thereof for effecting a plurality of different gear ratios under the optional control of the operator whereby an especially simple and compact transmission is produced.

Specifically, one object of the present invention is to provide a five speed transmission which is exceedingly compact and which is relatively short, due to a feature of the construction by which one of the sliding gears is arranged to effect two forward drives. Another object of the present invention is the provision of a five speed transmission in which each of two slidable gears are capable of being shifted into positions to provide two ratios, thus providing a transmission capable of several speeds but which is neither large nor complicated.

A further object of the present invention is the provision of a transmission embodying two countershafts, each driven from the driving shaft of the transmission but at different ratios so that one countershaft may be utilized in securing the higher speeds and the other countershaft may be used in securing the lower speeds. In this connection, the present invention also contemplates as an important feature thereof the provision of a gear formed on each of the countershafts and a slidable gear shiftable under the optional control of the operator to engage or mesh with either of the countershaft gears. In this manner the slidable gear is capable of securing two different ratios.

A further object of the present invention is the provision of a transmission in which the majority of the component gear members are of relatively small diameter so that the spinning effect of these gears is materially reduced due to the reduction in the inertia of these parts. One important advantage of this particular construction is that gear shifting is greatly facilitated.

Still further, another object of the present invention is a construction wherein comparatively small gears are used in the lower speeds or ratios, thus stressing these gears somewhat greater than is customary. This is, however, permissible since the parts employed for the lower ratios are not used to as great an extent as the gears for the higher ratios.

Another result of the compact transmission and the smaller parts is that economy in manufacture is realized due to the small amount of material employed and the simple construction of the component parts.

The above and other objects of the present invention will be apparent to those skilled in the art after a consideration of the preferred structural embodiment taken in conjunction with the accompanying drawings, illustrating such embodiment, in which:

Figure 1 is a vertical longitudinal section taken through a transmission constructed according to the principles of the present invention;

Figure 2 is a transverse section taken along the line 2—2 of Figure 1;

Figure 3 is a fragmentary longitudinal section illustrating a modified form of driving means for the two countershafts;

Figure 4 is a schematic view of the transmission construction illustrated in Figure 1 and showing all of the gears of the transmission developed in a single plane, corresponding to a section taken along the line A—A in Figure 2;

Figure 5 is a fragmentary view corresponding to Figure 4 but illustrating a modified form of construction for the reverse idler gear member, embodying a shiftable idler gear;

Figure 6 is a fragmentary schematic view illustrating a reverse idler member driven from a different countershaft gear than the reverse idler of the preferred form as illustrated in Figures 1 and 4;

Figure 7 illustrates a construction wherein the reverse idler is in the form of a compound gear with the two gear portions thereof shiftable with respect to each other and to the other transmission gears;

Figure 8 is a similar view illustrating a construction wherein one of the gear portions of the reverse idler is shiftable while the other gear portion is not shiftable;

Figure 9 is a schematic view illustrating a double sliding gear for the transmission to secure six speeds forward; and Figure 10 illustrates the transmission of the present invention as embodying a reverse idler of conventional construction.

Referring now to the drawings, particularly Figures 1, 2, and 4, the gear case or transmission housing 1 carries at its forward portion a clutch housing 2 of more or less conventional construction except that the rear wall 3 of the clutch housing is formed to enclose certain of the driving gears for one of the countershafts. Preferably, the clutch housing 2 is formed separately from the transmission housing 1 and is secured thereto in any manner desired. The wall 3 of the clutch housing 2 is formed with a forwardly projecting sleeve portion 5 which serves to enclose a driving shaft 6. The driving shaft 6 is adapted to be driven from the vehicle motor through the driven member of a standard type of clutch and is provided with a reduced end 7 adapted to be carried upon a pilot bearing 8 mounted in the fly wheel of the motor. At its rear end the driving shaft 6 is supported from the front wall 10 of the transmission housing 1 by bearing means 11 which includes anti-friction balls or rollers 12, an outer race 13 and an inner race 14, the latter being disposed on the driving shaft 6 while the outer race 13 is supported in the front wall 10.

The driving shaft 6 is provided with two gears 16 and 17 for driving the two countershafts 18 and 19. Preferably, the two gears 16 and 17 are disposed on opposite sides of the bearing 11, the gear 16 being formed integrally with the driving shaft 6 while the forward gear 17 is splined onto the driving shaft, as indicated in Figure 1 by the reference numeral 21. To accommodate the gear 17, which serves as a driving pinion for one of the countershafts, the wall 3 of the clutch housing 2 is provided with a recessed portion 23. A similar recessed portion accommodates the gear 40. The countershaft 18 is supported for rotation in the transmission housing by bearing means 25 and 26. The bearings 25 preferably take the form of rollers and are received within an outer race 29 carried by the front wall 10 of the housing 1. The rear bearings 26 include an inner race 30 mounted on the rear reduced end of the countershaft 18 and an outer race 32 which is supported from the rear wall 33 of the housing 1.

The second countershaft 19 is preferably tubular and is mounted directly upon the first countershaft 18 by two sets of bearings, the forward bearings being indicated by the reference numeral 35 and comprising annular ball bearing means of more or less conventional construction while the rear bearing means is indicated by the reference numeral 36 and takes the form of a plurality of rollers received within a suitably formed recess in the rear end of the tubular countershaft 19 and supported directly on the countershaft 18. The tubular countershaft 19 carries a gear 38 which is adapted to mesh with and be driven from the countershaft driving gear 16, which is the one formed integrally with the driving shaft 6. Preferably, both the gears 16 and 38 are helical to provide for quiet operation. The first countershaft 18 has its forward end splined, as indicated at 39, to receive a gear 40 which is adapted to mesh with and be driven from the splined gear 17 carried upon the driving shaft 6. Preferably, the gears 17 and 40 are spur gears for the sake of simplicity and economy. As will be apparent from Figures 1 and 4, gear member 17 is smaller than the gear member 16 and gear member 40 is larger than gear 38. This construction therefore constitutes the first countershaft 18 as the slow speed countershaft while the tubular countershaft 19 constitutes the high speed countershaft.

For effecting the various speeds or ratios desired, the transmission case 1 houses various other gears which will now be described. Gears 43 and 44 are carried upon the countershaft 19, and preferably the gears 38, 43, and 44, are all formed integrally therewith. Gears 38, 43, and 44 progressively vary in size or diameter in the order named.

The reference numeral 50 indicates the driven shaft of the transmission. This driven shaft is provided with a reduced forward end 51 which is supported by means of a standard type of anti-friction roller bearing 52 disposed within a correspondingly formed axial recess in the gear 16. The rear end of the driven shaft 50 is supported from the rear wall 33 of the transmission case 1 by conventional ball or roller means.

The driven shaft 50 is splined to receive a plurality of gear members and associated parts. Near its forward end the driven shaft 50 carries a shiftable clutch hub 54 provided with external splines 55 and 56. The rear face of the driving gear 16 is provided with a plurality of internal splines 58 of involute gear tooth form, the usual type used for such transmission parts, and when the clutch hub 54 is shifted forwardly the splines 55 engage the splines 58 and connect the driven shaft 50 directly with the driving shaft 6. Also adjacent its forward end, the driven shaft 50 carries a gear 60 which is rotatable on the driven shaft 50 but restrained from axial movement thereon and is arranged to be in constant mesh with the countershaft gear 43 on the high speed countershaft. Preferably, the gears 43 and 60 are of the helical type. The gear 60 is supported upon the driven shaft 50 by bushing means which provides for relative rotation mentioned above and therefore constitutes the gear 60 a floating gear. This bushing means, indicated in its entirety by the reference numeral 62, may be of any desired structure, but preferably bushing means similar to that disclosed in my copending application for a patent on a Transmission, Serial No. 512,596, filed January 31, 1931, is employed. The floating gear 60, like the driving gear 16, carries a plurality of internal splines 63 with which the splines 56 on the sliding clutch hub 54 may be engaged to operatively connect the floating gear 60 in nonrotatable relation with respect to the driven shaft 50.

As will be apparent, when the clutch hub 54 is shifted forwardly to engage the splines 55 and 58, the drive on the motor is transmitted directly through the driving shaft 62 to the driven shaft 50. When the clutch hub 54 is shifted rearwardly to engage the splines 56 and 63 the drive is transmitted from the driving shaft 6 through the gears 16 and 38 to the high ratio countershaft 19, and from there the drive is transmitted through the constant mesh helical gears 43 and 60 and through the clutch hub 64 to the driven shaft 50.

Adjacent its rear portion, the driven shaft 50 carries a pair of slidable gears 65 and 66 splined for axial movement on the driven shaft 50. Preferably, the splined gear 65 is mounted on the driven shaft 50 just to rear of the gear 44 on the high ratio countershaft 19 and adjacent the rear end of the latter, as best shown in Figure 1. The gear 65 is adapted to be shifted forwardly into engagement with the countershaft gear 44, and when gear 65 is so shifted the drive is transmitted from the driving shaft 6 through the high ratio countershaft 19 and the gears 44 and 65 to the driven shaft 50.

The low speed countershaft 18 which is driven from the driving shaft 6 by means of the spur gears 17 and 40 as explained above, carries a pair of gears 70 and 71. The gear 70 is disposed on the countershaft 18 closely adjacent the rear end of the tubular countershaft 19 and adjacent but in spaced relation with respect to the high ratio countershaft gear 44. Preferably, also, the gears 70 and 44 have the same number of teeth and are of the same size so that the splined gear 65 may be shifted rearwardly into engagement with the countershaft gear 70 on the low speed or low ratio countershaft 18. When the gear 65 is shifted rearwardly, the drive from the driving shaft 6 is transmitted through the spur gears 17 and 40, the low ratio countershaft 18, and the gears 70 and 65 to the driven shaft 50. Just to the rear of the countershaft gear 70 the small countershaft gear 71 is disposed, and just in rear of the latter is the large gear 66 splined on the driven shaft 50, the lowest speed being obtained by shifting the gear 66 forwardly into engagement with the countershaft gear 71.

To recapitulate, the three higher speeds are obtained through the high ratio countershaft 19. The highest speed or direct drive is obtained by shifting the clutch hub 34 forwardly to directly connect the driving and driven shafts; fourth speed is obtained by shifting the clutch hub 54 rearwardly to connect the floating gear 60 with the driven shaft; third speed is obtained by shifting the gear 65 forwardly into mesh with the countershaft gear 44 on the tubular countershaft 19. The two lower speeds are obtained through the low ratio countershaft 18, the gear 65 being shiftable rearwardly to engage the gear 70 to effect second speed and the gear 66 on the driven shaft 50 being shiftable forwardly to engage the smallest countershaft gear 71 to effect first speed. It is important to note that the higher group of speeds or ratios are obtained through one of the countershafts while the group of lower speeds or ratios are obtained through the other countershaft, the gear 65 being an operating part common to both groups, that is, when shifted forwardly the gear 65 engages the high ratio countershaft while when shifted rearwardly this gear engages with a gear on the low ratio countershaft. By virtue of this construction, where one sliding gear is used to secure two ratios a relatively short compact transmission is provided but there is, nevertheless, available a relatively large number of gear changes. Further, this construction allows smaller diameter gears to be used since the lower ratios will not be used to as great an extent as the higher ratios, and it is therefore permissible to stress the parts used for the lower ratios to a materially higher extent than the parts used for the higher ratios. Further, where smaller diameter gears are employed gear shifting is more easily accomplished because the spinning effect of small diameter gears is not as great as the spinning effect of larger gears, due to the greater inertia of the latter.

The present invention is not particularly concerned with the details per se of the means for shifting the gears 65 and 66 and the clutch hub 54 and hence the same has not been completely illustrated. Any form of gear shifting means found feasible or desirable may be employed within the scope of the present invention. It is sufficient to note, however, that the transmission housing 1 is provided with a top cover plate 78 which carries three shift rods indicated generally by the reference numerals 79, 80, and 81, and a pedestal or upstanding boss 82 in which a gear shift lever 83 is mounted for universal movement in the usual manner. Each of the shift rods 79 to 81 is provided with a lug or yoke 84 secured thereto in any manner desired as by a set screw 85, and with which the lower end 86 of the gear shift lever is adapted to be selectively engaged. Each of the shift rods is slidably mounted in the housing or cover plate and is movable to various positions corresponding to the different gear changes as is usual in transmission constructions. The three shift rods 79 to 81 are provided with shift forks 90, 91, and 92 engageable, respectively, with the clutch hub 54 and the gears 65 and 66, these parts being provided with suitable flanged collars for this purpose.

In a dual countershaft constant mesh five speed transmission as described above, various arrangements are possible for effecting reverse drive. In the preferred form, as illustrated in Figures 1, 2, and 4, a portion of the transmission housing 1 is extended laterally, as at 100 in Figure 2, to accommodate and to provide for the support of a relatively short rigid shaft 101 upon which is journaled a reverse idler in the form of a compound gear 102 having one gear portion 103, adapted to mesh with and be driven from the small countershaft gear 71 on the countershaft 18, and a second gear portion 104 disposed adjacent the rear wall 33 of the housing and just in rear of the neutral position of the splined driven gear 66. The gear element 103 is of smaller diameter than the gear element 104 so that the shaft 101 may be so disposed with respect to the axes of the driven shaft 50 and the countershafts 18 and 19 that the gear 66 on the driven shaft 50 may be shifted rearwardly into mesh with the reverse gear 104 while, when shifted forwardly into mesh with the countershaft gear 71 which drives the reverse gear 103, the gear 66 clears the latter and no interference can exist therebetween, as illustrated in Figure 2, certain of the gears being broken away to illustrate this relation. The reverse idler 102 may be supported for rotation on the shaft 101 by antifriction bearing means, such as a bushing 105 or roller bearings or the equivalent.

In Figure 1 the dual countershaft arrangement illustrated involves gear means for driving one of the countershafts from the driving shaft, which gear means is disposed on one side of the front wall of the housing, while the gear means for the other countershaft is disposed on the opposite side of the front wall of the housing. Under certain conditions it may be desirable to have both sets of gear means for these two countershafts disposed in rear of the front wall of the housing. Figure 3 illustrates such a construction, and from this figure it will be observed that in this modification the driving shaft 6 is provided with the usual driving gear 16 meshing with the countershaft gear 38 on the high ratio countershaft 19, and that the driving shaft 6 is also provided with a gear 17a which, instead of being splined thereon as in Figure 1, is machined integral with respect to the driving shaft 6. The gear 17a is disposed between the bearing means 12 and the gear 16 and meshes with a countershaft driving gear 40a which is splined onto the low ratio countershaft 18 just to rear of the bearing means 25 therefor.

In addition to the means shown in Figures 1 and 4 for effecting reverse drive, other forms of reverse idlers may be utilized in a construction embodying the principles of the present invention. In Figure 5 there is illustrated a construction wherein the reverse idler does not run continuously in mesh with the small countershaft gear 71 but is adapted to be shifted into simultaneous engagement with both the countershaft gear 71 and the splined gear 66. In this figure the reverse idler is indicated by the reference numeral 110 and is shorter than the idler shown in Figure 1. The reverse idler is shiftably mounted on the shaft 101 and is provided with a shift groove 115 by which the position of the reverse idler 110 may be controlled. The reverse idler is formed as a compound gear and includes two gear portions 116 and 117, the former being adapted to be meshed with the countershaft gear 71 while the latter is adapted to mesh with the gear 66. Like Figure 4, Figure 5 is a developed view. The position of the shaft 101 and the diameters of the gear portions 116 and 117 are so arranged that whenever the reverse idler 110 is shifted toward the left in Figure 5 the gear portion 116 meshes with the countershaft gear 71 while at the same time the gear portion 117 meshes with the gear 66. Thus, in Figure 5, the gear 66 is shiftable forwardly into engagement with the countershaft gear 71 to effect the lowest forward drive but, in effecting reverse drive, the reverse idler 110 is itself shifted to connect the gears 71 and 66 to rotate the latter in a reverse direction. The reverse idler 110 may be shifted by any conventional form of gear shifting means.

Figure 6 illustrates a construction quite similar to Figure 4 except that the reverse idler 102a is somewhat longer than is illustrated in Figure 4 and has the forward gear portion 120 thereof so disposed as to lie in a position to mesh with the larger countershaft gear 70 on the low ratio countershaft 18, the sizes of the gear portions 120 and 121 being so proportioned as to provide the desired reverse gear reduction. The rear gear portion 121 of the reverse idler is adapted to be meshed with the sliding gear 66 when the latter is shifted rearwardly, as described for the form shown in Figure 4.

Figure 7 is illustrative of a reverse gear arrangement wherein a low ratio reverse and a high ratio reverse may be provided. In this case the reverse idler in its entirety is indicated by the reference numeral 125 and will be seen to comprise a compound gear member embodying a splined hub 126 and a pair of gear members 127 and 128 slidable thereon. The hub 126 is supported upon the relatively short rigid shaft 101 as in the modifications described above. Each of the gears 127 and 128 is provided with a flanged collar by which suitable shift forks or the equivalent may be engaged to control the position of the gears 127 and 128. From Figure 7 it will be noted that the forward gear member 127 is disposed in between the tubular countershaft gear 44 and the gear 70 carried by the other countershaft 18. As mentioned above, these gear members 44 and 70 have the same number of teeth and are of the same diameter, and hence, like the shiftable gear member 65, the slidable reverse gear 127 may be meshed with either of the gears 44 and 70. Since gear 44 is formed on the high ratio countershaft it revolves at a higher rate than does the gear 70 which is carried by the low ratio countershaft 18. As in the modification shown in Figure 5, the gear 66 shown in Figure 7 is adapted to be shifted forwardly to engage the small countershaft gear 71 carried by the low ratio countershaft 18 to effect the lowest forward drive. In Figure 7, however, the reverse gear 128 is adapted to be shifted forwardly into engagement with the splined gear 66 to complete the reverse connection. Thus, in this form, the reverse gear 127 may be selectively positioned for either high or low reverse speed by shifting the same into engagement with either the high speed countershaft gear 44 or the low speed countershaft gear 70, and then the reverse gear 128 may be shifted to engage the gear 66 on the driven shaft to complete the reverse connection. In this case, the gear 127 and the gear 128 will be so proportioned that the gear 127 will be enabled to mesh with either the gear 44 or the gear 70 but will clear the driven shaft gear 65, while yet permitting the reverse gear 128 to mesh with the driven shaft gear 66.

Figure 8 is a construction similar in many respects to the construction illustrated in Figure 7 but is somewhat simpler in form in that the rear reverse gear 128 is formed integrally with the splined hub 126 rather than shiftable thereon as in Figure 7. In Figure 8, while the reverse gear 127 may be optionally shifted forwardly or rearwardly to secure high or low speed in reverse, it is preferable to shift the gear 66 rearwardly to engage the reverse gear 128 since the latter is integral with the hub 126, rather than shifting the entire gear and hub, although the latter arrangement is possible.

Under some conditions it may be desirable to provide six forward speeds, in addition to reverse, and this may be accomplished by forming gear 66 as a double gear having two gear elements 66a and 66b as indicated in Figure 9, the gear portion 66a being adapted to mesh with the countershaft gear 71 while the gear portion 66b is adapted to mesh with an additional countershaft gear 130 formed at the rear end of the low speed countershaft 18. Preferably, the gear 66a is smaller than the gear 66b and the additional countershaft gear 130 is smaller than the countershaft gear 71. For effecting reverse drive in this form of transmission, any of the reverse gear mechanisms described above may be employed. For purpose of illustration I have shown a reverse idler 131 of the compound gear type shiftably mounted on a rigid shaft 132 similar to the idler supporting shaft 101 described above. For effecting reverse drive in this modification the reverse idler 131 may be shifted forwardly to bring its gear portions in mesh with the gears 130 and 66b. It is not necessary, of course, that the reverse idler 131 be a compound gear.

Figure 10 illustrates the provision of a more or less conventional reverse idler construction as employed in a transmission of the type described above. In Figure 10 the reverse idler is a single gear 140 supported upon a short rigid shaft 141 and disposed to be continuously meshed with a small countershaft gear 142 cut on the rearmost end of the low speed countershaft 18. The countershaft gear 142 is disposed just rearwardly of the splined gear 66 and is of a diameter smaller than the countershaft gear 71 with which the gear 66 is adapted to mesh when shifted forwardly. By virtue of this construction when the splined gear 66 is shifted rearwardly it clears the small countershaft gear 142 but meshes with the reverse idler 140. This form of reverse gearing may be employed in lieu of the compound gear construction described above.

While I have shown and described above the preferred constructions in which the present invention is preferably embodied, it will be apparent to those skilled in the art that my invention is not to be limited to the specific details described above but that, in fact, widely different means may be employed in the practice of the broader aspects of my invention.

What I claim, therefore, and desire to secure by Letters Patent is:

1. A change speed transmission comprising a housing, driving and driven shafts journaled therein, a countershaft journaled for rotation in the housing and operatively driven from said driving shaft, a tubular countershaft concentrically disposed with respect to said first countershaft and also operatively driven from said driving shaft, a countershaft gear carried on each of said countershafts in axially spaced relation, a splined gear shiftably mounted on said driven shaft and disposed between said countershaft gears, said splined gear being shiftable in either direction to optionally engage one of said countershaft gears, a second splined gear carried by said driven shaft, and means for effecting reverse drive comprising a reverse idler in the form of a compound gear, one gear portion of which is shiftably mounted and adapted to be shifted into engagement with either of said countershaft gears for operatively driving said reverse idler, and means for effecting a driving connection between said second splined gear on the driven shaft and the other gear portion of said compound gear.

2. A change speed transmission comprising a housing having front and rear walls, driving and driven shafts journaled in said walls, a countershaft journaled for rotation in and supported only at said front and rear walls, gear means connecting said countershaft with said driving shaft, a tubular countershaft having bearing support upon said first countershaft, gear means for driving the second countershaft directly from said driving shaft at a different ratio than said first countershaft, said gear means being disposed at the forward end of the second countershaft, a gear carried by said tubular countershaft spaced forwardly from the rear end thereof, a second gear carried by said first countershaft adjacent to but rearwardly of the rear end of said tubular countershaft, a third gear slidably mounted on said driven shaft substantially in the plane of the rear end of the tubular countershaft and adapted to be shifted longitudinally to optionally engage the gear carried by either of said countershafts, and bearing means disposed in the plane occupied by said third gear and the rear end of said tubular countershaft for supporting the latter on said first countershaft.

3. A change speed transmission comprising a housing, driving and driven shafts journaled therein, a countershaft journaled for rotation in the housing, gear means connecting said countershaft with the driving shaft, a tubular countershaft journaled for rotation on and supported by said first countershaft, separate gear means connecting said tubular countershaft with said driving shaft, said gear means serving to drive the countershafts at different ratios, a pair of axially spaced gears, one carried by each of said countershafts, a splined shaft disposed adjacent the rear end of said first countershaft, and means including a slidable gear carried by said splined shaft and shiftable thereon to mesh with either of said countershaft gears.

4. A change speed transmission comprising a housing, driving and driven shafts therein, a pair of countershafts journaled for rotation in said housing and each connected with said driving shaft to be driven therefrom at different ratios, a pair of juxtaposed gears, one carried by each of said countershafts, and means for effecting reverse drive including a splined shaft, a splined gear shiftable thereon to mesh with either of said countershaft gears, and means for transmitting reverse drive from said splined shaft to said driven shaft.

5. A change speed transmission comprising a housing, driving and driven shafts therein, a pair of countershafts journaled for rotation in said housing and each connected with said driving shaft to be driven therefrom at different ratios, a pair of juxtaposed gears, one carried by each of said countershafts, a third gear carried by one of said countershafts, a splined driven shaft having slidable gears thereon shiftable into and out of engagement with said countershaft gears, and means for effecting reverse drive including a splined shaft, a gear slidable thereon and adapted to mesh with either of said pair of juxtaposed gears, and another gear carried by said reverse splined shaft and adapted to mesh with one of the slidable gears on said splined driven shaft.

6. A change speed transmission comprising a housing having front and rear walls, driving and driven shafts journaled in said walls, a countershaft journaled for rotation in and supported only at said front and rear walls, gear means connecting said countershaft with said driving shaft, a tubular countershaft having bearing support upon said first countershaft, gear means for driving the second countershaft directly from said driving shaft at a different ratio than said first countershaft, said gear means being disposed at the forward end of the second countershaft spaced forwardly from the rear end thereof, a second gear carried by said first countershaft adjacent to but rearwardly of the rear end of said tubular countershaft, a third gear slidably mounted on said driven shaft substantially in the plane of the rear end of the tubular countershaft and adapted to be shifted longitudinally to optionally engage the gear carried by either of said countershafts, bearing means disposed in the plane occupied by said third gear and the rear end of said tubular countershaft for supporting the latter on said first countershaft, and means for effecting reverse drive comprising a reverse idler in the form of a compound gear, one gear portion of which is disposed in the plane of said bearing means and adapted to be shifted into engagement with either of said first and second countershaft gears for operatively driving said reverse idler and means for effecting a driving connection between the other gear portion of said compound gear and said driven shaft.

ROBERT LAPSLEY.